United States Patent [19]

Lucas et al.

[11] Patent Number: 5,233,003
[45] Date of Patent: Aug. 3, 1993

[54] PROCESS FOR THE PREPARATION OF GEL-FREE SELF-CROSSLINKING COPOLYMERS DERIVED FROM BLOCKED ISOPROPENYL-ALPHA, ALPHA-DIMETHYLBENZYL ISOCYANATE

[75] Inventors: Howard R. Lucas, Danbury; Kuang-Jong Wu, Shelton, both of Conn.

[73] Assignee: American Cyanamid Company, Stamford, Conn.

[21] Appl. No.: 963,880

[22] Filed: Oct. 20, 1992

[51] Int. Cl.$^5$ ..................... C08G 18/80; C08G 18/81
[52] U.S. Cl. ......................................... 526/301; 528/45
[58] Field of Search ........................... 526/301; 528/45

[56] References Cited

U.S. PATENT DOCUMENTS

| | | | |
|---|---|---|---|
| 3,290,350 | 12/1966 | Hoover | 260/453 |
| 4,130,577 | 12/1978 | Nagato et al. | 260/453 P |
| 4,377,530 | 3/1983 | Trenbeath et al. | 260/453 P |
| 4,439,616 | 3/1984 | Singh et al. | 560/25 |
| 5,116,930 | 5/1992 | Yabuta et al. | 528/45 |

FOREIGN PATENT DOCUMENTS

| | | | |
|---|---|---|---|
| 266659 | 5/1988 | European Pat. Off. | |
| 64087606 | 9/1987 | Japan | 12/26 |
| 63-186722 | 8/1988 | Japan | 18/81 |
| 2160534 | 12/1985 | United Kingdom | |

OTHER PUBLICATIONS

Eastman Kodak, "Three-Dimensional Approach to Solubility".

M. S. Fedoseev et al., Chem. Abstracts, 75: 48232 (1971).

G. R. Griffin et al., Industrial Engineering and Chemical Products Research and Development, vol. 1, p. 265 (1962).

C. B. Rielly et al, Paper presented before Div. of Paint, Plastics and Printing Ink Chemistry of the Am. Chem. Soc. Atlantic City, Sep. 1956.

Z. W. Wicks, Jr., Progress in Organic Coatings, vol. 3, pp. 73-99 (1975).

Z. W. Wicks, Jr., Progress in Organic Coatings, vol. 9, pp. 3-28 (1981).

D. K. Parker et al., Rubber Chemistry and Technology, vol. 63, No. 4, p. 584 (1990).

S. P. Pappas and E. H. Urruti, Proceedings of the Water-Borne and Higher-Solids Coatings Symposium, New Orleans, La., vol. 13, p. 146 (1986).

*Primary Examiner*—Maurice J. Welsh
*Attorney, Agent, or Firm*—M. J. Kelly; F. M. Van Riet; B. E. Lerman

[57] ABSTRACT

An improved process for preparing a one component self-crosslinking resin is provided. The process for making the self-crosslinking resin is carried out by copolymerizing an oxime-blocked m-isopropenyl-alpha, alpha-dimethylbenzyl isocyanate (m-TMI), hydroxyethyl acrylate, and another unsaturated monomer at 75° C. to 85° C. in a polar organic solvent having a dipole moment of at least 3, such as acetonitrile. The polar solvent retards the thermal deblocking of the blocked TMI, thereby preventing the premature self-crosslinking and gelation of the copolymerization product prior to its use as a self-crosslinking resin.

25 Claims, No Drawings

PROCESS FOR THE PREPARATION OF GEL-FREE SELF-CROSSLINKING COPOLYMERS DERIVED FROM BLOCKED ISOPROPENYL-ALPHA, ALPHA-DIMETHYLBENZYL ISOCYANATE

BACKGROUND OF THE INVENTION

1. Field of the Invention

This invention relates to the preparation of self-crosslinking copolymers derived from blocked isopropenyl-alpha, alpha-dimethylbenzyl isocyanate and hydroxy group containing olefinically unsaturated monomers. Self-crosslinking copolymers are useful as self-curing resins in coatings, adhesives, and moldings.

2. Description of the Related Art

In general, commonly used urethane coatings systems are of the two-component or one-component types.

A typical two-component paint comprises, for example, a polyisocyanate material and a polyhydroxy material, which upon curing, can form films with excellent physical properties and resistance properties. Two component systems are used in high performance coatings.

A typical one-component paint comprises, for example, a blocked polyisocyanate and a polyhydroxy material. Because the isocyanate groups are blocked, one component systems generally have a longer shelf life than two-component systems containing free, hydroxy-reactive isocyanate groups. When desired, the one-component systems may be activated by, for example, heat, to deblock the blocked polyisocyanate and promote crosslinking.

Japanese Patent No. 63-186,722 discloses a coatings system wherein the blocked isocyanate and hydroxy groups are part of the same polymer backbone, thereby producing a self-crosslinking type one-component system. Similar ethanol-blocked copolymers are disclosed in JP 1-087,606.

U.S. Pat. No. 5,116,930 discloses another approach to self-crosslinking resins. This approach is accomplished by hydroxyfunctionalization of a polyiso-cyanate polymer. It is stated therein in column 1 and in Comparative Example 3, Column 9, that when a self-curing resin is produced by copolymerizing an oxime-blocked isocyanate-containing free radical-polymerizable monomer and a hydroxy-containing free radical-polymerizable monomer, the blocking agent may undergo dissociation during polymerization, disadvantageously leading to gelation, as it does in the comparative Example 3 using xylenes as the solvent. Further, during our efforts to prepare these polymers, we have ourselves observed, on numerous occasions, the setting up of the contents of the reactor into a crosslinked gel destroying the reactor used in the process. A solution for the gelation problem has been described in the copending application submitted concurrently herewith entitled "N-Hydroxysuccinimide-Blocked Isopropenyl-alpha, alpha-Dimethylbenzyl Isocyanate and Self-Crosslinking Copolymers Thereof", American Cyanamid Case Ser. No. 07/963,778. Another solution to the gelation problem comprising using a polar solvent in the preparation of the self-crosslinking copolymers is described herein.

It is therefore an object of this invention to provide an improved process for preparing gel-free self-crosslinking copolymers wherein the improvement comprises carrying out the polymerization in a polar organic solvent which retards the dissociation of the blocking groups, thereby preventing premature gelation.

SUMMARY OF THE INVENTION

This invention is an improved process for preparing self-crosslinking resins by copolymerizing a blocked isopropenyl-alpha, alpha-dimethylbenzyl isocy-anate and a hydroxy group containing ethylenically unsaturated monomer in a polar organic solvent such as acetonitrile. Using a polar organic solvent in the improved process has the advantage of retarding the thermal deblocking of the blocked isocyanate groups, thereby preventing crosslinking and gelation of the copolymer in the reactor. The self-crosslinking resins prepared by the improved process of the invention are gel-free.

DESCRIPTION OF THE PREFERRED EMBODIMENTS

This invention is an improved process for preparing self-crosslinking resins wherein a blocked isopropenyl-alpha, alpha-dimethylbenzyl isocyanate is reacted with a hydroxy group containing ethylenically unsaturated monomer, and optionally also with an ethylenically unsaturated monomer free of hydroxy groups, in a solvent and in the presence of a free radical initiator, wherein the improvement comprises:
  (a) adding, over a period of time, to a reaction zone maintained at a temperature of at least about 30° C.:
    (i) a polar organic solvent;
    (ii) a blocked isopropenyl-alpha, dimethylbenzyl isocyanate;
    (iii) a hydroxy group containing ethylenically unsaturated monomer;
    (iv) optionally, an ethylenically unsaturated monomer free of hydroxy groups; and
    (v) a free radical initiator; and
  (b) thereafter heating the reaction mixture at a temperature and for a length of time sufficient to produce a gel-free self-crosslinking resin.

The term "polar organic solvent" as used in the context of this invention defines any organic solvent which has a dipole moment, in Debye units, of at least 3.0.

Dipole moment measurements are scattered in the chemical literature. Comprehensive listings are found in a book by R. J. W. LeFevre entitled "Dipole Moments", Chemical Publishing Company of New York, N.Y. (1938); in a book by A. L. McClellan entitled "Tables of Experimental Dipole Moments", W. H. Freeman and Company, San Francisco (1963); in "Handbook of Chemistry and Physics", 46th edition; and in a publication by Eastman Chemicals (Kodak) entitled "Three-Dimensional Approach to Solubility".

Polar organic solvents usable in the process of the invention are organic solvents which have dipole moments of at least 3.0 Debye units and may include at least one member of the following general classes:
1. alkyl nitriles
2. nitroalkanes and nitroarenes
3. dialkyl sulfones and sulfoxides
4. 1,3-diketones
5. N-alkyl pyrrolidones
6. lactones
7. N,N-dialkyl acetamides
9. dialkyl and alkylene carbonates
10. hexamethylphosphorus triamide (HMPT), and
11. hexamethylphosphoramide (HMPA).

Illustrative examples of polar organic solvents usable in this invention and their dipole moments, are listed below:

| POLAR SOLVENT | DIPOLE MOMENT (Debye Units) |
|---|---|
| Butylene Carbonate | 5.3 |
| Propylene Carbonate | 5.0 |
| Ethylene Carbonate | 4.9 |
| Dipropyl Sulfone | 4.5 |
| Benzonitrile | 4.4 |
| Nitrobenzene | 4.3 |
| Butyrolactone | 4.1 |
| Propiolactone | 4.1 |
| Dimethyl Sulfoxide | 4.0 |
| Butyronitrile | 4.0 |
| Capronitrile | 4.0 |
| Propionitrile | 4.0 |
| Acetonitrile | 3.9 |
| Dimethyl Carbonate | 3.8 |
| N,N-Dimethyl Formamide | 3.8 |
| N,N-Dimethyl Acetamide | 3.8 |
| N,N-Diethyl Formamide | 3.8 |
| N,N-Diethyl Acetamide | 3.8 |
| Nitropropane | 3.7 |
| Nitroethane | 3.6 |
| Nitromethane | 3.4 |
| Diacetone Alcohol | 3.2 |
| Acetyl Acetone | 3.1 |

The preferred solvents include benzonitrile, butyronitrile, capronitrile, propionitrile, acetonitrile, dipropylsulfone, sulfolane, dimethyl sulfoxides, nitromethane, nitroethane, nitropropane, nitrobenzene, acetyl acetone, N,N-diethylformamide, N,N-diethylacetamide, N,N-dimethylformamide, N,N-dimethyl acetamide, ethylene carbonate, butylene carbonate, N-methylpyrrolidone, butyrolactone, and mixtures thereof.

The most preferred solvent is acetonitrile which has a dipole moment of 3.7.

In a review article in Progress in Organic Coatings, Volume 3, pages 73 to 99 (1975), on page 75, it is stated that the rate of deblocking of phenol blocked isocyanates increases with increasing solvent polarity. Therein are cited the studies conducted by M. S. Fedoseev et al. summarized in Chemical Abstracts 75:48232 (1971), studies of G. R. Griffin et al. in Industrial Engineering and Chemical Products Research and Development, Volume 1, page 265 (1962), and the paper presented before the Division of Paint, Plastics and Printing Ink Chemistry of the American Chemical Society in Atlantic City, N.J. in September 1956, by C. B. Rielly and M. Orchin, all of which demonstrate increased deblocking with an increase in solvent polarity.

We have found, unexpectedly, that the deblocking rate of blocked isopropenyl- alpha, alpha- dimethylbenzyl isocyanate decreases with an increase in solvent polarity. This finding is depicted in TABLE 1 of EXAMPLE 17 with epsilon-caprolactam as the blocking group. We have further found that because of the diminished deblocking rates in polar solvents, carrying out the improved process of the invention in a polar organic solvent such as acetonitrile prevents gelation of the reaction product during and after copolymerization.

The polymerizable blocked isocyanate used in this invention is an isopropenyl-alpha, alpha-dimethylbenzyl isocyanate blocked with a blocking group such as methyl ethyl ketone oxime, hereinafter MEKO. The meta-isomer of the monomer, hereinafter m-TMI, is commercially available as TMI ® (meta) Unsaturated Aliphatic Isocyanate from American Cyanamid Company, Wayne, N.J., as a colorless liquid of greater than 94 percent purity, and may be preferably used to prepare the oxime-blocked polymerizable isocyanates. Other isomers, such as the para-isomer, hereinafter p-TMI, or a mixture of isomers, such as meta- and para-mixtures may also be used. The meta- and para-isomers of TMI are represented, respectively, by the formulas:

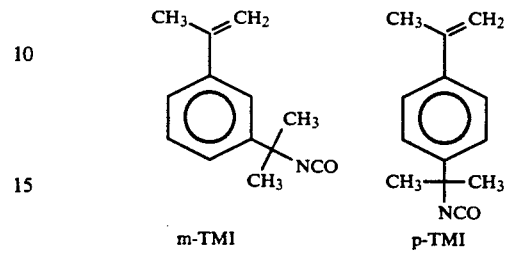

m-TMI       p-TMI

Various methods of preparation of TMI are described in U.S. Pat. Nos. 3,290,350; 4,130,577; 4,377,530; 4,439,616; and European Patent Appln. No. 266,659.

The oxime blocked isocyanates derived from TMI may be prepared by contacting, for example, m-TMI with an oxime such as MEKO. An oxime such as MEKO may be prepared from methyl ethyl ketone, for example, and hydroxylamine by known methods. MEKO-blocked m-TMI is represented by the formula:

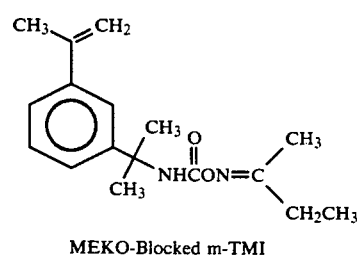

MEKO-Blocked m-TMI

Blocking groups suitable for use include oximes, phenols, lactams, alcohols, active methylene compounds, and N-hydroxyimides.

Oxime blocking groups are the preferred blocking groups for TMI and include oximes such as acetone oxime, MEKO, methyl isopropyl ketone oxime, diisopropyl ketone oxime, 3-pentanone oxime, cyclobutanone oxime, cyclopentanone oxime, cyclohexanone oxime, acetophenone oxime, formaldoxime, acetaldoxime, propionaldehyde oxime, butyraldehyde oxime, glyoxal monoxime, diacetyl monoxime, and mixtures thereof.

Also, blocked TMI with blocking groups particularly labile at temperatures below 85° C. may be advantageously used in the process of the invention. Among such thermally labile blocking groups are phenol and substituted phenols such as cresols, chlorophenols, nitrophenols, cyanophenols, and alkoxycarbonyl phenols.

Other deblocking groups such as caprolactam, butyrolactam, pyrrolidone, methanol, ethanol, propanol, butanol, diethyl malonate, N-hydroxysuccinimide, and the like may also be used.

The hydroxy group containing ethylenically unsaturated monomer usable in this invention includes 2-hydroxyethyl acrylate, 2-hydroxyethyl methacrylate, 2-hydroxypropyl acrylate, 2-hydroxypropyl methacrylate, 2,3-dihydroxypropyl acrylate, 2,3-dihydroxypropyl methacrylate, allyl alcohol, methylallyl alcohol, and mixtures thereof.

In addition to the blocked TMI and the hydroxy group containing ethylenicaly unsaturated monomer, one or more ethylenically unsaturated monomers which do not contain hydroxy groups may be used in the process of the invention t impart certain physical and resistance properties to the copolymer. Such monomers include methyl acrylate, methyl methacrylate, ethyl acrylate, ethyl methacrylate, propyl acrylate, propyl methacrylate, butyl acrylate, butyl methacrylate ethylhexyl acrylate, ethylhexyl methacrylate, acrylonitrile, methacrylonitrile, styrene, alpha-methyl styrene, vinyl acetate, dialkyl fumarates, dialkyl maleates, vinyl chloride, vinylidene chloride, vinyl toluene, and mixtures thereof.

The free radical initiators usable in the process of the invention are initiators which are capable of generating free radicals at temperatures preferably in the range of about 75° C. to about 85° C., and include initiators such as azobisisobutyronitrile, azobisvaleronitrile, benzoyl peroxide, tert-butyl peroctoate, tert-amyl peroctoate, tert-butyl hydroperoxide, di-tert-butyl peroxide, dicumyl peroxide, and tert-butyl peroxyisopropylcarbonate.

To control the molecular weight of the copolymer, a chain transfer agent such as dodecyl mercaptan, also referred to herein as dodecyl thiol, may also be optionally used. Other well known methods such as lowering or raising the reaction temperature or the initiator level may also be employed to increase or decrease the molecular weight of the polymer, as desired.

The proportion of the ingredients in the reaction zone charge depends on the desired self-cross- linking copolymer composition.

The amount of the polar organic solvent in the total charge is from about 10 weight percent to about 90 weight percent, preferably from about 40 weight percent to about 80 weight percent, based on the weight of the total reaction zone charge. The term "total reaction zone charge" or "total charge" is used herein to mean the total amount of ingredients (i) to (v), including optional ingredients such as chain transfer agents and the like. The term "total monomer charge" or "total monomer" is used in the context of this invention to mean the total amount of ingredients (ii), (iii), and (iv). If more than one monomer is used as ingredient (iv) for example, then the total monomer content is the sum of all monomers used as ingredient (iv) in addition to the blocked TMI and the hydroxy group containing olefinically unsaturated monomer.

The term "crosslinkingly reactive components" is used herein to mean the total amount of ingredients (ii) and (iii).

The amount of total monomers in the total charge is in the range of from about 10 weight percent to about 90 weight percent, and preferably from about 40 weight percent to about 80 weight percent, based on the weight of the total charge.

The molar ratio of the blocked TMI to the hydroxy group containing olefinically unsaturated monomer is from about 1.5:1 to about 0.5:1, and preferably about 1:1. The molar ratio of the crosslinkingly reactive components to the optional olefinically unsaturated monomer (iv) is from about 3:1 to about 0.1:1, and preferably from about 0.5:1 to about 1:1.

The amount of the free radical initiator is typically from about 0.01 weight percent to about 15 weight percent of the total monomers depending on the molecular weight desired. It is typically from about 1 weight percent to about 8 weight percent of the total monomers.

The amount of the chain transfer agent, if used, may be from about 0.01 to about 15 weight percent of the total monomers depending on the molecular weight desired. It is typically from about 1 weight percent to about 4 weight percent of the total monomers.

The molecular weight of the copolymers obtained by the process of the invention is from about 1,000 to about 1,000,000, and preferably from about 5,000 to about 50,000.

In the practice of the process of the invention, ingredients (i) to (v) are simultaneously added in step (a) either as a homogenous mixture of all the ingredients, or each through a separate stream into the reaction zone maintained at a temperature preferably in the range of about 75° C. to about 85° C. When the ingredients are added through separate streams, one or more streams may be premixed prior to addition to the reaction zone. Furthermore, the rate of addition of any ingredient may be kept the same, or varied as desired to carry out the copolymerization reaction at a deficiency or excess of that ingredient.

The addition is preferably carried out simultaneously by adding all the ingredients either as a mixture or separately through separate steams; however, a sequential addition may also be used.

When the addition is sequential, a portion of the solvent is added first, followed by addition of the remaining ingredients, for example. Another example of a sequential addition is when the free radical initiator is added last, after adding the remaining ingredients.

The addition usually is carried out over a period of time in the range of about 1 hour to about 5 hours, but an addition time of about 3 to about 4 hours is preferred.

Step (b) of the process is carried out by heating the reaction mixture further, preferably at a temperature of about 75° C. to about 85° C. for a period of time of from about 1 hour to about 5 hours. During the heating step (b), an additional amount of a free radical initiator may be added to the reaction mixture to ensure complete polymerization of the monomers.

If the polymerization is carried out in a manner in which the total time of adding (step 1) and heating (step 2) exceeds about 10 hours, self-crosslinking in the reactor may take place producing an insoluble crosslinked gel which could not be removed from the reactor. Under the conditions of the process disclosed herein, gel formation is avoided and the process produces a gel-free self-crosslinking copolymer usable as a resin in coatings, moldings, and adhesives, for example.

EXAMPLE 1

This example illustrates the ability of acetonitrile, a polar organic solvent of the invention, to prevent gelation of a MEKO-blocked m-TMI copolymer.

A. Copolymerization In Methyl Amyl Ketone

To a 500 ml flask, equipped with stirring, nitrogen sparge tube, thermometer with controller set at 80° C., heating mantel, and a reflux condenser, was added 7.4 g of ethyl amyl ketone and sparged with nitrogen for 30 minutes. Heat was applied to the flask to bring the contents to 80° C. Upon reaching this temperature, a nitrogen sparged solution of 66.6 g of methyl amyl ketone, 80.4 g of MEKO blocked m TMI, 93.2 g of butyl acrylate, 33.8 g of hydroxyethyl acrylate, 14.6 g of methyl methacrylate, 9.4 g of t-butyl peroctoate and 4.7 n-dodecyl mercaptan was added to the flask over a period of 4 hours. To complete the polymerization, the heating at 80° C. was continued; however, approximately 2 hours. after the last addition of the monomers, the polymer gelled.

B. Copolymerization In Acetonitrile

The experiment in Part A of this example was repeated with the exception that, instead of the methyl amyl ketone solvent, acetonitrile was used. In this case no gelation occurred even after 4 hours of heating after the last addition of monomers.

EXAMPLE 2

The general procedure of Example 1, Part B, was repeated with the following amounts and reaction conditions:

7.5 g of acetonitrile was added initially to the 500 ml flask which was sparged with $N_2$ for 45 minutes and then heated to 81° C. A solution of 67.5 g of acetonitrile, 55.3 g of methyl methacrylate, 70.7 g of butyl acrylate, 30.8 g of hydroxyethyl methacrylate, 68.2 g MEKO-blocked m-TMI, 9.0 g of t-butyl peroctoate and 4.5 g of n-dodecylmercaptan was added over a period of 3 hours. Heating was continued at 81° C. for an additional 5 hours. Solids were determined to be 70.7%. No gelation occurred.

EXAMPLE 3

The procedure of Example 2 was repeated, except a solution of 67.8 g of acetonitrile, 72.5 g of m-TMI blocked with MEKO, 86.2 g of butyl acrylate, 33.4 g of hydroxyethyl acrylate, 33.6 g of methyl methacrylate, 9.4 g of t-butyl peroctoate and 4.7 g of n-dodecanethiol was added over a period of 4.5 hours at 80° C. Heating was continued at 80° C. for 4 hours. Pan solids were determined to be 72.0%. No gelation occurred.

EXAMPLE 4

The procedure of Example 2 was repeated, except 6.7 g of acetonitrile was added to the flask initially, then a solution of 60.0 g of acetronitrile, 77.4 g of m-TMI blocked with MEKO, 53.4 g of butyl acrylate, 40.2 g of methyl methacrylate, 31.0 g of hydroxyethyl acrylate, 8.4 g of t-butyl peroctoate and 4.2 g of n-dodecanethiol was added over 4 hours and 10 minutes, after which period heating was continued at 80° C. for an additional 4 hours. Pan solids were determined to be 71.1%. No gelation occurred. The reaction product was analyzed by High Performance Size Exclusion Chromatography (HPSEC). The number average molecular weight (Mn), the weight average molecular weight (Mw), and the polydispersity were as follows:
Mn=7300
Mw=19300
Mw/Mn=Polydispersity=2.65

EXAMPLE 5

The procedure of Example 4 was repeated, except 16.8 g of t-butyl peroctoate was added. Solids were determined to be 69%. No gelation occurred.
Mn=7900
Mw=19000
Polydispersity=2.38

EXAMPLE 6

The procedure of Example 5 was repeated, except Lupersol ® 101 was used instead of t-butyl peroctoate. Solids were determined to be 67.4%. No gelation occurred.
Mn=4861
Mn=10320
Polydispersity=2.12

Lupersol ® 101 initiator is a product of Pennwalt Corporation (Lucidol) and has the chemical name of 2,5-dimethyl-2,5-bis (t-butylperoxy) hexane.

EXAMPLE 7

The procedure of Example 2 was repeated, except that 6.7 g of acetonitrile was added initially to the flask followed by a solution of 60.0 g of aceto- nitrile, 62.4 g of m-TMI blocked with MEKO, 55.5 g of butyl acrylate, 50.6 g of methylmethacrylate, 33.5 g of hydroxyethyl acrylate, 8.4 g of t-butyl peroctoate and 4.2 g of n-dodecanethiol at 80° C. over a 5 hour period. Heating was continued for an additional 3 hours. Pan solids were determined to be 68.9%. No gelation occurred.
Mn=8400
Mw=24,6000
Polydispersity=2.93

EXAMPLE 8

The procedure of Example 2 was repeated using the following conditions and amounts:

4.4 g of acetonitrile were added to the flask and sparged with nitrogen for 10 minutes. With sparging continuing, the temperature was brought to 81° C., whereupon a solution of 31.5 g of methyl methacrylate, 40.3 g of butyl acrylate, 17.8 g of hydroxyethyl methacrylate, 42.7 g of n-hydroxy succinimide blocked m-TMI, 3.5 g of t-butyl peroctoate and n-dodectyl mercaptan was added over a period of 3 hours and 50 minutes. Heating was continued for an additional 4 hours and 10 min. Pan solids were determined to be 76.0%; conversion was 99.8%; NCO analysis wa 2.7% corresponding to 87.7% of theory. No gelation occurred.
Mn=11400
Mw=57500
Polydispersity=5.04.

EXAMPLE 9

The procedure of Example 2 was repeated, except a solution of 67.5 g of acetonitrile, 53.7 g of methyl methacrylate, 68.7 g of butyl acrylate, 29.9 g of hydroxyethyl methacrylate, 72.7 g of m-TMI blocked with N-hydroxy succinimide, 9.0 g of t-butyl peroctoate and 4.5 g of n-dodecanethiol was added. The solution was added over a period of 3 hours and 30 minutes. Heating was continued at 81° C. for an additional 3 hours and 10 minutes. Pan solids were determined to be 75.5%. No gelation occurred.

EXAMPLE 10

The procedure of Example 2 was repeated, except a solution of 67.5 g of acetonitrile, 52.7 g of methyl methacrylate, 67.5 g of butyl acrylate, 29.4 g of hydroxyethyl methacrylate, 75.7 g of m-TMI blocked with e-caprolactam, 9.0 g of t-butyl peroctoate and 4.5 grams of n-dodecanethiol was added to the heated flask at 81° C. over a period of 3½ hours. Heating continued at 81° C. for an additional 4 hours. Pan solids were determined to be 72.7%. No gelation occurred.

EXAMPLE 11

The procedure of Example 2 was repeated, except a solution of 67.5 g of acetonitrile, 56.0 g of methyl methacrylate, 7.17 g of butyl acrylate, 31.2 g of hydroxyethyl methacrylate, 66.1 g of m-TMI blocked with n-butanol, 9.0 g of t-butyl peroctoate and 4.5 g of n-dodecanethiol was added over a period of 3½ hours. After the addition, heating at 81° C. was continued for an additional 4 hours. Pan solids were determined to be 75.7%. No gelation occurred.

EXAMPLE 12

The procedure of Example 2 was repeated, except that 7.8 g of acetonitrile was added to the flask initially and a solution of 69.7 g of acetonitrile, 79.4 g of m-TMI blocked with e-caprolactam, 86.2 g of butyl acrylate, 33.4 g of hydroxyethyl acrylate, 1.46 grams of methyl methacrylate, 9.4 g of t.butyl peroctoate and 4.7 g of n-dodecanethiol were added over a period of 4 hours 15 minutes. Heating was continued for an additional 4 hours at 81° C. Pan solids were determined to be 73.5%. No gelation occurred.

EXAMPLE 13

The procedure of Example 2 was repeated, except that 8.0 g of acetonitrile was initially added to the flask and a solution of 71.8 g of acetonitrile, 109.7 g of m-TMI blocked with e-caprolactam, 89.4 g of butyl acrylate, 40.2 g of hydroxyethyl acrylate, 9.5 g of t-butylperoctoate, and 4.7 g of d-dodacanethiol were added over a period of 4 hours at 81° C. Pan solids were determined to be 72.5%. No gelation occurred.

EXAMPLE 14

The procedure of Example 2 was repeated, except 6.9 g of acetonitrile was initially added to the flask and a solution of 62.2 g of acetonitrile, 77.8 g of m-TMI blocked with methanol, 89.4 g of butyl acrylate, 40.2 g of hydroxyethyl acrylate, 9.4 g of t.butyl peroctoate and 4.7 g of n-dodecanethiol was added over a period of 4.5 hours at 80° C. Heating was continued for an additional 4 hours. Pan solids were determined to be 74.6%. No gelation occurred.

EXAMPLE 15

The procedure of Example 7 was repeated using benzonitrile instead of acetonitrile. The copolymer did not gel until after 8 hours of polymerization time.

EXAMPLE 16

The procedure of Example 7 was repeated using nitromethane instead of acetonitrile. The polymer did not gel until after 8 hours of polymerization time.

EXAMPLE 17 e-Caprolactam (e-CAP) blocked m-TMI solutions in toluene, dimethyl sulfoxide (DMSO), nitromethane, or acetonitrile solvents were heated at 80° C. for a period of 10 hours, in the presence of 4 molar equivalents of normal butanol to react with any m-TMI formed during the experiment as a result of deblocking. Quantitative analysis by Nuclear Magnetic Spectroscopy (NMR), by measuring the amount of the n-butanol adduct of m-TMI formed, revealed the unexpected result that polar solvents retard the deblocking of the blocked m-TMI derivative e-CAP/m-TMI. The results are summarized in TABLE 1.

TABLE 1
FORMATION OF n-BUTANOL ADDUCT OF e-CAP-BLOCKED m-TMI AT 80° C. WITHIN 10 HOURS

| Solvent | Butanol Adduct |
|---|---|
| Toluene | 16% |
| DMSO | 2% |
| Nitromethane | Trace |
| Acetonitrile | Trace |

The deblocking of blocked m-TMI derivatives was studied by Infrared Spectroscopic (IR) techniques to determine their response to heat, particularly to determine the onset temperature for deblocking reactions and also to determine the rapid deblocking temperatures of the blocked m-TMI derivatives. The results are summarized in TABLE 2.

TABLE 2
DEBLOCKING OF BLOCKED ISOCYANATES

| Blocking Group | Onset Temperatures For Deblocking (°C.) | Rapid Deblocking Temperatures (°C.) |
|---|---|---|
| Methanol | 155** | 190* |
| n-Hexanol | 155** | 175* |
| n-Hydroxy-succinimide | 115** | 140** |
| e-Caprolactam | 90** | 125** |
| Acetone Oxime | 50** | 80** |
| Methyl Ethyl Ketone Oxime | 50** | 65** |

*Temperature ramp from 29° C. to 202° C. at 5° C./minute, with the infrared spectrum measured at intervals corresponding to 5° C. temperature change.
**Same as above except temperature ramp at 1° C./minute.

It is evident from the results in TABLE 1 and TABLE 2 that considerable deblocking occurs at typical polymerization temperatures which, in the case of selfcrosslinking copolymer systems, would lead to gelation.

EXAMPLE 18

Preparation of Blocked m-TMI Derivatives

The blocking of m-TMI is carried out by general methods and procedures used to prepare other blocked isocyanates, such as those described Z. W. Wicks, Jr., in Progress in Organic Coatings, Volume 3, pages 73 to 99 (1975) and also ibid. Volume 9, pages 3 to 28 (1981).

A. Caprolactam-blocked m-TMI was prepared by the procedures described by D. K. Parker et al. in Rubber Chemistry and Technology, Volume 63, Number 4, page 584 (1990).

B. MEKO-Blocked m-TMI was prepared by combining equimolar quantities of m-TMI and methyl ethyl ketone oxime (MEKO). The adduct has been mentioned in JP 63-186,722, GB 2,160,534, and by S. P. Pappas and E. H. Urruti in the proceedings of the Water-Borne and Higher-Solids Coatings Symposium, New Orleans, La., Volume 13, page 146 (1986).

C. Methanol blocked m-TMI was prepared by adding m-TMI to a tenfold excess amount of methanol and heating at the boiling point of the mixture overnight.

D. Butanol blocked m-TMI was prepared by adding m-TMI to a tenfold excess amount of normal butanol and heating at the boiling point of the mixture for 3 hours.

E. N-Hydroxysuccinimide blocked m-TMI was prepared as follows:

To a mixture of N-hydroxysuccinimide (197.8 g) obtained from Aldrich Chemical Company, Milwaukee, Wis., in a mixture of toluene (525 g) and methylene chloride (100 g), m-TMI (197.8 g) was added dropwise at 45° C. to 50° C. over a period of 90 minutes with stirring. After allowing the mixture to stand overnight at room temperature, the colorless precipitate was collected by filtration under reduced pressure with the aid of a rubber dam, washed twice with 100 ml portions of toluene and dried at room temperature under reduced pressure to give N-hydroxysuccinimide-blocked m-TMI (438 g, 95% yield); melting point: 135°–137° C.; the infrared (in nujol) and 1H nuclear magnetic resonance spectra indicated that the product was N-hydroxysuccinimide-blocked m-TMI.

EXAMPLE 19

The following self-crosslinking copolymers prepared by the process of this invention were tested as one component self-crosslinking type resins for coatings:

(1) Products of Example 8 (summarized in TABLE 3)

perature/time schedule to produce the cure coatings. The results are summarized in TABLES 3, 4 and 5.

TABLE 3

CURED COATINGS FROM TIN-CATALYZED SELF-CROSSLINKING OF THE PRODUCT OF EXAMPLE 8

|   | 30 min cure Temp (°C.) | Pencil Hardness | MEK Double Rubs | Impact Front/Reverse |
|---|---|---|---|---|
| 0.1% T-12 (1) | 110 | 2H | 50 | 140/140 |
|   | 120 | 3H | 80 | 140/140 |
|   | 130 | 3H+ | 125 | 140/140 |
|   | 140 | 3H | 200+ | 140/140 |
|   | 150 | 4H | 200+ | 140/140 |
| 0.1% TK-1 | 120 | F | 70 | <20/20 |
|   | 140 | 2H | 200 | 100/<20 |
|   | 160 | 4H+ | 200 | 100/20 |

(1) T-12 is dibutyltindilaureate
(2) TK-1 is tetrabutyldiacetoxystanoxane (TBDAS)

TABLE 4

CURED COATINGS FROM TIN-CATALYZED SELF-CROSSLINKING OF THE PRODUCTS OF EXAMPLES 2, 9, 10 AND 11

|   | Product of Example 2[1] | Product of Example 9[1] | Product of Example 10[1] | Product of Example 11[1] |
|---|---|---|---|---|
| Cure Response |   |   |   |   |
| 125° C., 30 min |   |   |   |   |
| Thickness, mils | 1.8 | 1.7 | 1.5 | 2.1 |
| Hardness KHN | 10.5 | 10.5 | 8.4 | 3.1 |
| Pencil Hardness | F-H | F-H | H-2H | 2B-B |
| MEK Rubs Mar/Remove | 200+ | 100/200+ | 20/200+ | 1/2 |
| Yellow Index | −2.3 | −2.3 | −2.5 | −3.3 |
| 135° C., 30 min |   |   |   |   |
| Thickness, Mils | 1.6 | 1.5 | 1.7 | 1.8 |
| Hardness KHN | 11.9 | 11.4 | 9.3 | 3.5 |
| Pencils Hardness | F-H | F-H | H-2H | 2B-B |
| Mek Rubs Mar/Remove | 200+ | 200+ | 200/200+ | 1/5 |
| Yellow Index | −1.6 | −1.8 | −2.1 | −3.2 |
| 145° C., 30 min |   |   |   |   |
| Thickness, Mils | 1.6 | 1.5 | 1.7 | 1.8 |
| Hardness KHN | 11.9 | 11.6 | 10.3 | 4.9 |
| Pencil Hardness | F-H | H-2H | H-2H | 2B-B |
| Mek Rubs Mar/Remove | 200+ | 200+ | 200/200+ | 1/20 |
| Yellow Index | +0.6 | −0.8 | −1.7 | −2.9 |

[1]Contains a 0.5% UL-28 catalyst based on solids. UL-28 is dimethyltindilaurate.

TABLE 5

CURED COATINGS FROM TIN-CATALYZED SELF-CROSSLINKING OF THE PRODUCTS OF EXAMPLES 3, 5, 6 AND 7

|   | Product of Example 3[1] | Product of Example 5[1] | Product of Example 6[1] | Product of Example 7[1] |
|---|---|---|---|---|
| 125° C. × 30 min |   |   |   |   |
| Film thickness mils | 1.3 | 1.3 | 1.5 | 1.3 |
| Hardness KHN | 6.2 | 8.2 | 10.9 | 9.3 |
| Pencil Hardness | HB-F | B—HB | HB-F | HB-F |
| Mek Rubs Mar/Remove | 200+ | 200+ | 200+ | 200+ |
| Yellow Index | −3.2 | −2.9 | −3.3 | −3.1 |
| Mw of Resin | — | 19,300 | 10,300 | 24,600 |

[1]Contains 0.5% UL-28 catalyst based on solids.

(2) Products of Examples 2, 9, 10, and 11 (summarized in TABLE 4)
(3) Products of Examples 3, 5, 6, and 7 (summarized in TABLE 5)

Each copolymer was dissolved in a mixture of methyl isobutyl ketone (42 weight percent), xylenes (16 weight percent), and 1-methoxy-2-propyl acetate (42 weight percent), and after adding a tin-based cure catalyst, the mixture was applied onto white base coated ED-11 primed cold roll steel (CRS) panels. The coated panels were then heated in a vented oven at a particular tem- Although the present invention has been described with reference to certain preferred embodiments, it is apparent that modifications and variations thereof may be made by those skilled in the art without departing from the scope of this invention as defined by the appended claims.

We claim:

1. In a process for preparing a self-crosslinking copolymer comprising adding a solvent, a blocked isopropenyl-alpha, alpha-dimethylbenzyl isocyanate, a hydroxy group containing ethylenically unsaturated monomer, optionally an ethylenically unsaturated monomer free of hydroxy groups, and a free radical initiator, and thereafter heating, the improvement which comprises:
(a) adding, over a period of time, to a reaction zone maintained at a temperature of at least 30° C.:
  (i) a polar organic solvent;
  (ii) a blocked isopropenyl-alpha, alpha-dimethylbenzyl isocyanate;
  (iii) a hydroxy group containing ethylenically unsaturated monomer;
  (iv) optionally, an ethylenically unsaturated monomer free of hydroxy groups; and
  (v) a free radical initiator; and
(b) thereafter heating at a temperature and for a length of time sufficient to produce a gel-free self-crosslinking copolymer.

2. The process of claim 1 wherein ingredients (i) to (v) are added simultaneously.

3. The process of claim 1 wherein ingredients (i) to (v) are added sequentially.

4. The process of claim 1 wherein the blocked isocyanate is blocked meta-isopropenyl-alpha, alpha-dimethylbenzyl isocyanate.

5. The process of claim 4 wherein the blocking group is selected from the group consisting of oximes, phenols, lactams, alcohol, and active methylene compounds.

6. The process of claim 5 wherein the blocking group is selected from the group consisting of phenol, acetone oxime, methyl ethyl ketone oxime, cyclohexanone oxime, and a mixture thereof.

7. The process of claim 6 wherein the oxime is methyl ethyl ketone oxime.

8. The process of claim 1 wherein the hydroxy group containing unsaturated monomer is selected from the group consisting of hydroxyethyl acrylate, hydroxyethyl methacrylate, and a mixture thereof.

9. The process of claim 1 wherein the optional ethylenically unsaturated monomer is selected from the group consisting of methyl acrylate, methyl methacrylate, ethyl acrylate, ethyl methylacrylate, butyl acrylate, butyl methacrylate, ethylhexyl acrylate, ethylhexyl methacrylate, acrylonitrile, methacrylonitrile, styrene, alpha-methyl styrene, vinyl acetate, dialkylfumarate, dialkylamaleate, vinyl chloride, vinylidene chloride, vinyl toluene, and mixtures thereof.

10. The process of claim 1 wherein the free radial initiator is tertiary butyl peroctoate.

11. The process of claim 1 wherein the polar organic solvent has a dipole moment of at least 3.0 Debye units.

12. The process of claim 11 wherein the polar solvent is selected from the group consisting of alkyl nitriles, nitroalkanes, nitroarenes, dialkyl sulfones, dialkyl sulfoxides, 1,3-diketones, N-alkyl pyrrolidones lactones, N,N-dialkyl formamides, N,N-dialkylacetamides, dialkyl carbonates, alkylene carbonates, hexamethylphosphorus triamide, hexamethylphosphoramide, and mixtures thereof.

13. The process of claim 12 wherein the polar organic solvent is selected from the group consisting of acetonitrile, benzonitrile, sulfolane, ethylenecarbonate, nitromethane, N,N-dimethylformamide, N,N-dimethylacetamide, butyrolactone, N-methylpyrrolidone, and mixtures thereof.

14. The process of claim 13 wherein the solvent is acetonitrile.

15. The process of claim 1 wherein the addition time in step (a) is from 1 to 5 hours.

16. The process of claim 1 wherein the heating time is from 1 to 5 hours.

17. The process of claim 1 wherein the temperature in step (a) and step (b) are both in the range of 75° C. to 85° C.

18. A gel-free self.crosslinking copolymer prepared by the process of claim 1.

19. In a process for preparing a self-crosslinking copolymer comprising adding a solvent, a blocked isopropenyl-alpha, alpha-dimethyl- benzyl isocyanate, a hydroxy group containing ethylenically unsaturated monomer, optionally, an ethylenically unsaturated monomer free of hydroxy groups, and a free radical initiator, and thereafter heating, the improvement which comprises:
(a) adding, over a period of about 1 to about 5 hours, to a reaction zone maintained at a temperature from about 75° C. to about 85° C.:
  (i) acetonitrile;
  (ii) an oxime blocked isopropenyl-alpha, alpha-dimethylbenzyl isocy-anate;
  (iii) a hydroxy group containing ethylenically unsaturated monomer;
  (iv) optionally, an ethylenically unsaturated monomer free of hydroxy groups; and
  (v) a free radical initiator; and
(b) thereafter heating at about 75° C. to about 85° C. temperature for a period of about 1 to about 5 hours to produce a gel free self-crosslinking copolymer.

20. The process of claim 19 wherein the oxime blocked isocyanate is methyl ethyl ketone oxime blocked metaisopropenyl-alpha, alpha-dimethylbenzyl isocyanate.

21. The process of claim 19 wherein the hydroxy group containing monomer is selected from the group consisting of hydroxyethyl acrylate, hydroxyethyl methacrylate, and a mixture thereof.

22. The process of claim 19 wherein the olefinicaly unsaturated monomer is selected from the group consisting of methyl acrylate, methyl methacrylate, ethyl acrylate, ethyl methacrylate, butyl acrylate, butyl methacrylate, and a mixture thereof.

23. A gel-free self-crosslinking copolymer prepared by the process of claim 19.

24. In a process for preparing a self- crosslinking copolymer comprising adding a solvent, a blocked isopropenyl-alpha, alpha- dimethylbenzyl isocyanate, a hydroxy group containing ethylenically unsaturated monomer, an ethylenically unsaturated monomer, and a free radical initiator, and thereafter heating, the improvement which comprises:
(a) adding, over a period of about 1 to 5 hours, to a reaction zone maintained at a temperature from about 79° C. to about 82° C.:
  (i) acetonitrile;
  (ii) methyl ethyl ketone oxime blocked meta. isopropenyl-alpha, alpha-dimethylbenzyl isocyanate;
  (iii) hydroxyethyl acrylate or methacrylate;
  (iv) a monomer selected from the group consisting of methyl methacrylate, butyl acrylate, and a mixture thereof; and
  (v) tert-butyl peroctoate; and
(b) thereafter heating at about 79° C. to about 82° C. temperature for a period of about 1 to about 5 hours to produce a gel-free self-crosslinking copolymer.

25. A gel-free self-crosslinking copolymer prepared by the process of claim 24.

* * * * *